US009030485B2

(12) United States Patent
Cho et al.

(10) Patent No.: US 9,030,485 B2
(45) Date of Patent: May 12, 2015

(54) APPARATUS AND METHOD FOR CORRECTING COLOR OF IMAGE PROJECTION DEVICE

(71) Applicants: Electronics and Telecommunications Research Institute, Daejeon (KR); National University of Sciences & Technology, Islamabad (PK)

(72) Inventors: Yong Ju Cho, Seoul (KR); Yong Ju Lee, Daejeon (KR); Seung Kwon Beack, Seoul (KR); Ji Hun Cha, Daejeon (KR); Seong Yong Lim, Daejeon (KR); Myung Seok Ki, Daejeon (KR); Joo Myoung Seok, Daejeon (KR); Jin Woong Kim, Daejeon (KR); Muhammad Murtaza Khan, Islamabad (PK); Rehan Hafiz, Islamabad (PK); Haris Anis, Islamabad (PK); Mutahir Latif, Islamabad (PK); Ashar Rasul, Islamabad (PK); Arshad Ali, Islamabad (PK)

(73) Assignees: Electronics and Telecommunications Research Institute, Daejeon (KR); National University of Sciences & Technology, Islamabad (PK)

( * ) Notice: Subject to any disclaimer, the term of this patent is extended or adjusted under 35 U.S.C. 154(b) by 240 days.

(21) Appl. No.: 13/658,039

(22) Filed: Oct. 23, 2012

(65) Prior Publication Data
US 2013/0194292 A1 Aug. 1, 2013

(30) Foreign Application Priority Data

Jan. 31, 2012 (KR) .................... 10-2012-0010051
Oct. 8, 2012 (KR) .................... 10-2012-0111325

(51) Int. Cl.
*G09G 5/00* (2006.01)
*G09G 5/02* (2006.01)
(Continued)

(52) U.S. Cl.
CPC ............ *H04N 9/3147* (2013.01); *G06F 3/1446* (2013.01); *G09G 2320/0233* (2013.01);
(Continued)

(58) Field of Classification Search
USPC ......... 345/418–419, 589–590, 600–602, 606, 345/619, 660, 549; 348/207.1, 222.1, 254, 348/552, 557; 358/515–518, 519, 523, 525, 358/537–538, 448, 452–453; 382/162, 382/164–167, 170–171, 173, 254, 274, 276, 382/282, 298, 300, 305, 307
See application file for complete search history.

(56) References Cited

U.S. PATENT DOCUMENTS

| | | | | |
|---|---|---|---|---|
| 5,726,779 | A * | 3/1998 | Kadowaki et al. | ............. 358/520 |
| 7,145,597 | B1 * | 12/2006 | Kinjo | ......................... 348/222.1 |
| 7,639,401 | B2 | 12/2009 | Bala | |
| 7,948,499 | B2 | 5/2011 | Ramanath | |
| 2002/0140957 | A1 * | 10/2002 | Matama | ......................... 358/1.9 |

(Continued)

FOREIGN PATENT DOCUMENTS

KR 10-2011-0095556 A 8/2011

*Primary Examiner* — Wesner Sajous
(74) *Attorney, Agent, or Firm* — William Park & Associates Ltd.

(57) ABSTRACT

An apparatus and a method for correcting colors of an image projection device are provided. The method includes: acquiring a photographed image by photographing a sample image projected on projection surface; generating input-output color information for n regions, based on color values of a block in the sample image and corresponding color values of the block in the photographed image; selecting one of the n regions of photographed images as a reference region; generating look-up tables (LUTs) for non-reference regions, based on the reference region and the input and output color information; and correcting colors of input images to be projected by the image projection device using the look-up tables, thereby minimizing color difference of the input images on the projection surface for both intra and inter projection device color correction while simplifying the correction procedure.

20 Claims, 12 Drawing Sheets

(51) Int. Cl.
  *G09G 5/36* (2006.01)
  *H04N 5/46* (2006.01)
  *H04N 1/46* (2006.01)
  *H04N 1/40* (2006.01)
  *G03F 3/08* (2006.01)
  *G06K 9/00* (2006.01)
  *G06K 9/40* (2006.01)
  *G06K 9/36* (2006.01)
  *H04N 9/31* (2006.01)
  *G06F 3/14* (2006.01)

(52) U.S. Cl.
  CPC ............... *G09G2320/0285* (2013.01); *G09G 2320/0693* (2013.01); *H04N 9/3182* (2013.01); *H04N 9/3194* (2013.01)

(56) References Cited

U.S. PATENT DOCUMENTS

2003/0068084 A1* 4/2003 Kinjo et al. .................. 382/164
2005/0275911 A1* 12/2005 Yamada et al. ............... 358/518

* cited by examiner

SAMPLE IMAGE

FIG. 12
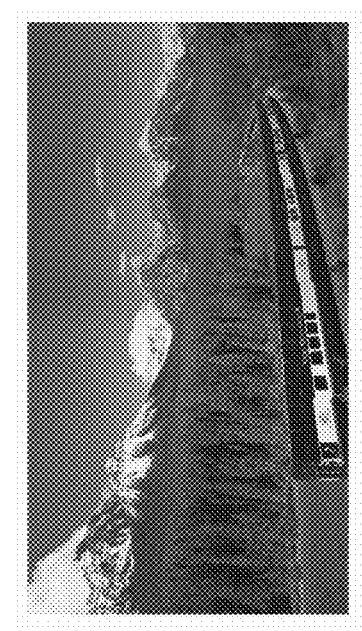
(b)
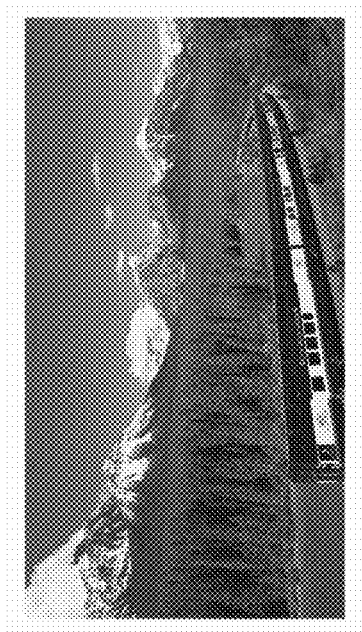
(a)

APPARATUS AND METHOD FOR CORRECTING COLOR OF IMAGE PROJECTION DEVICE

CROSS-REFERENCE TO RELATED APPLICATIONS

This application claims the benefit of priority of Korean Patent Application No. 10-2012-0010051 filed on Jan. 31, 2012, and 10-2012-0111325 filed on Oct. 8, 2012, which is incorporated by reference in their entirety herein.

BACKGROUND OF THE INVENTION

1. Field of the Invention

The present invention relates to an apparatus and a method for correcting color, and more particularly, to an apparatus and a method for correcting color of an image projection device or a multi-projector display system, using a sample image.

2. Related Art

A projector is used to project an image on a projection surface such as a screen. Generally, when light is emitted through the lens of a projector, the light passing through the central portion of the lens appears the brightest and the light passing through the peripheral portion of the lens appears dark. This phenomenon of reduction of light intensity towards the peripheral portion of the lens is referred to as the vignetting effect. As such, an image projected using a projector cannot project a regular uniform color on a screen due to the vignetting effect. In addition, when a panoramic image is projected by a plurality of projectors, there is a problem of color mis-match in the projected images because of the type (LCD, LED, LCOS, and others), model and manufacturer of projectors. Even projectors of the same model, from the same manufacturer, have different color values i.e. for the same input color the projected colors appear different.

Methods for matching colors of different projectors are known. However, according to the related art these methods require a plurality of sample images and complicated color correction procedures. In addition, in case of a multi projection system, it is difficult to apply the methods for correcting color.

SUMMARY OF THE INVENTION

The present invention provides an apparatus and a method for correcting colors of an image projection device i.e. color within the projected field of view does not change.

In addition, the present invention provides an apparatus and a method for correcting colors for a multi image projection device.

Further, the present invention provides an apparatus and a method for correcting color using a single sample image and a look up table.

According to an exemplary embodiment of the present invention, the proposed method for correcting colors for an image projection device is performed by an apparatus for correcting colors, comprising of: acquiring a photographed image by an image acquiring device, by photographing a sample image projected on a projection surface, the photographed image comprising n regions, generating 3D color cubes for the n regions of the photographed image, based on the color values of each block in the sample image and the color values of the corresponding block in the photographed image, selecting a reference 3D color cube, generating look-up tables (LUTs) for each of the n regions, based on the reference 3D color cube, and correcting colors of input images to be projected by the image projection device using the look-up tables.

According to another exemplary embodiment of the present invention, an apparatus is proposed for correcting colors for an image projection device, comprising of: a receiving unit configured to acquire a photographed image by an image acquiring device, the photographed image consisting of n regions, by photographing a sample image containing n regions, projected on a projection surface by an image projection device, a color information generating unit configured to generate 3D color cubes for the n regions in the photographed image, based on the color values of each block in the sample image and the color values of the corresponding block in the photographed image, a color conversion unit configured to select a reference 3D color cube, and generate look-up tables (LUTs) for each of the n regions, based on the reference 3D color cube, a memory unit configured to record the look-up tables, a color correction unit configured to correct colors of input images using the look-up tables, and a transmitting unit configured to transmit the corrected input images to the image projection device.

According to yet another exemplary embodiment of the present invention, an apparatus is proposed for correcting colors for a multi image projection device system, comprising: a receiving unit configured to acquire m photographed images, each of the m photographed images contains n regions, by photographing a sample image sequentially projected on a projection surface by each of the m image projection devices configuring a multi image projection device by an image acquiring device, respectively, a color information generating unit configured to generate 3D color cubes for m×n regions, based on color values of each block in the sample image and color values of the block of the each m photographed images corresponding to the block in the sample image, a color conversion unit configured to select a reference 3D color cube, and generate look-up tables (LUTs) for each of the n regions, based on the reference 3D color cube, a memory unit configured to record the look-up tables, a color correcting unit configured to correct colors of images to be input to the multi image projection device using the look-up tables, and a transmitting unit configured to transmit the corrected input images to each image projection device.

BRIEF DESCRIPTION OF THE DRAWINGS

FIGS. 12A and 12B are diagrams showing a change in an input image after and before color correction according to the exemplary embodiment of the present invention.

DESCRIPTION OF EXEMPLARY EMBODIMENTS

Figure 1:
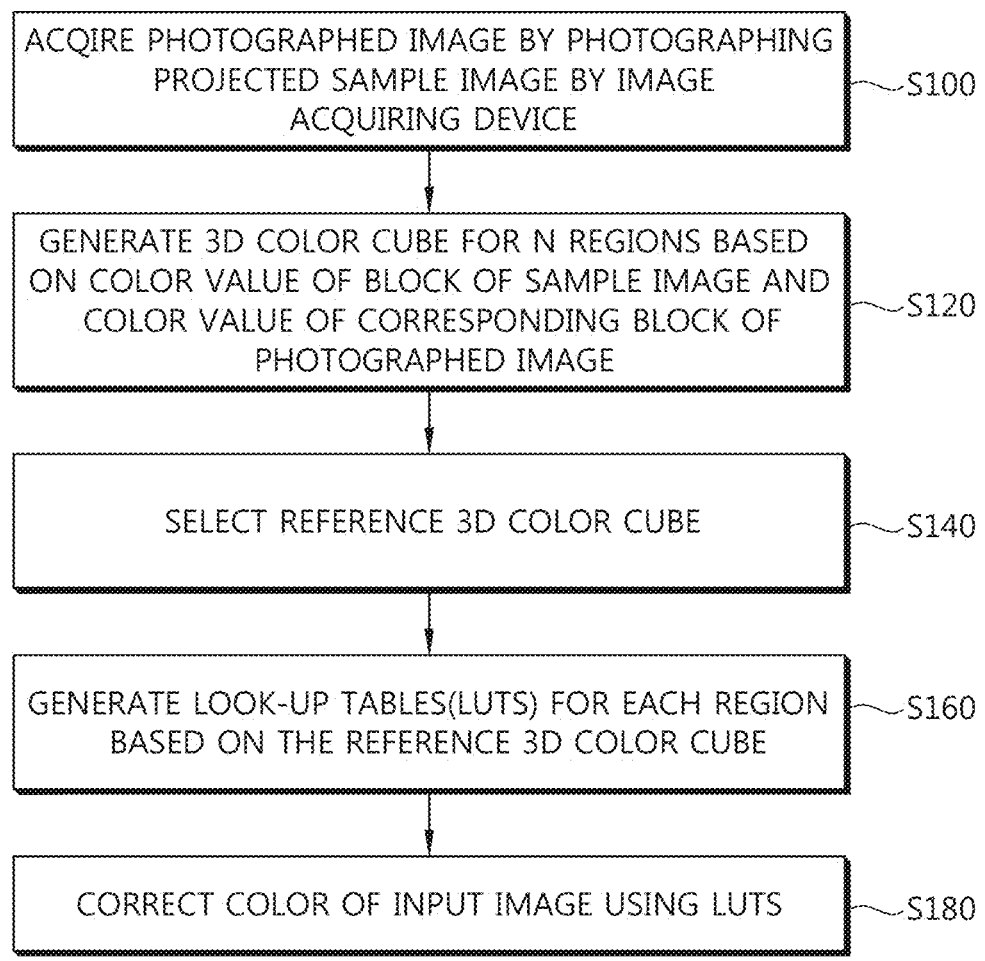
FIG. 1 is a diagram showing a method for correcting colors for an image projection device that is performed by an apparatus for correcting colors according to an exemplary embodiment of the present invention.

Hereinafter, some exemplary embodiments of the present invention will be described in detail with reference to the illustrative drawings. In the accompanying drawings, portions unrelated to the description will be omitted in order to obviously describe the present invention, and similar reference numerals will be used to describe similar portions throughout the present specification. Further, in describing exemplary embodiments of the present invention, well-known functions or constructions will not be described in detail since they may unnecessarily obscure the understanding of the present invention.

Furthermore, in the present invention, the meaning of 'correcting colors' includes performing modification (or compensation) on each input color value for each region so as each output color value is equal or closest to each corresponding reference color value.

FIG. 1 is a diagram showing a method for correcting colors for an image projection device, that is performed by an apparatus for correcting colors according to an exemplary embodiment of the present invention.

Referring to FIG. 1, an apparatus is described for correcting colors by projecting a sample image on a projection surface by an image projection device and acquiring a photographed image by an image acquiring device (S100).

Here, the sample image is an image that is a basis for determining color distortion of the image projection device and output images which are projected to the projection surface (color distortion may happen based on not only the image projection device itself but also color or shape (ex. uneven, concave or convex) of the projection surface). The sample image may be directly generated by the apparatus for correcting colors. Alternatively, a pre-generated sample image having known color values may also be used. As an example, the sample image may comprise of n regions (or repetitions) of the same pattern of same size. As a result, in the apparatus for correcting colors, a process of comparing color values for each image region can be efficiently performed.

Here, n regions mean at least one region. For example, in such a case correcting the color of projected images between different projectors of a multi-projector display system, n can be a single region.

Figure 2:
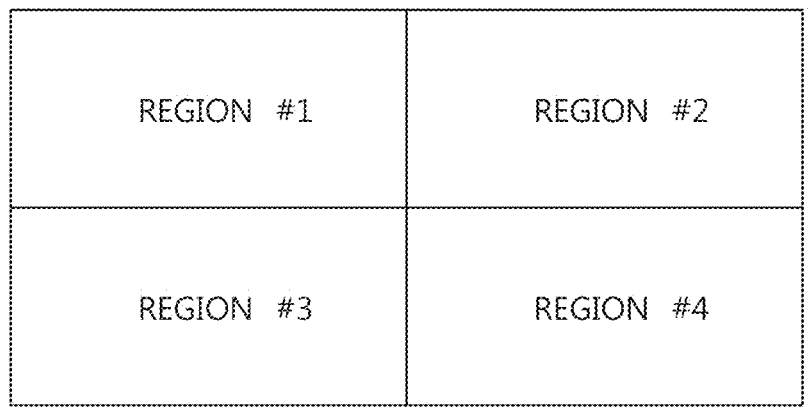
FIG. 2 is a diagram showing a sample image that is divided into four (n=4) regions having the same size.

FIG. 2 is a diagram showing the sample image that comprises of four (n=4) regions having the same size.

Referring to FIG. 2, the sample image may comprise of four regions, wherein each region can be referred to as region #1 to region #4. When an HD image having size, for example, 1920×1080, is divided into four regions having the same size, the size of each region becomes 960×540. When the image is divided into six regions having the same size, a size of each region becomes 640×540.

Each region of the sample image includes a plurality of blocks and the color values of each of the plurality of blocks correspond to R, G, and B, wherein the R, G, and B may each have any one value between a minimum value and a maximum value. Here, when each of the R, G, and B is assigned 8 bits, the minimum value can be 0 and the maximum value can be 255.

In addition, the R, G, and B values are each set to be a multiple of k and has a value between the minimum and maximum value. For example, when k is set to be 50, the plurality of blocks may each have one of the 216 color values (0, 0, 0), (0, 0, 50), . . . , (250, 250, 250) out of the possible 256×256×256=1677216 color values. The k value may be a previously set value and may also be designated based on an input by a user interface. Further, the R, G, and B values may be set to have a constant or non-constant interval rather than being set to be a multiple of k to generate the sample image.

As an example, all the possible color values that can be represented by the R, G, and B may be included within each region of the sample image at last once. i.e. each region of sample image may include all the possible color values, and the possible color values correspond to the plurality of blocks within each region at least once. (if k=50 and each 8 bit R, G, and B values are set to multiple of k, the number of possible color values is 216). In this case, as described above, when the R, G, and B are each assigned with 8 bits and k is set to be 50, the plurality of blocks may each have one of the 216 color values from (0, 0, 0), (0, 0, 50), . . . , (250, 250, 250). Meanwhile, the plurality of blocks within each region must include 216 colors at least once, thus the total number of blocks included in each region of the sample image need to be set to be at least 216 for the case of k=50. In this case, for example, the R, G, and B color values of the plurality of blocks included in each region may be comprised with patterns sequentially increased by 50 from top left to bottom right.

Figure 3:
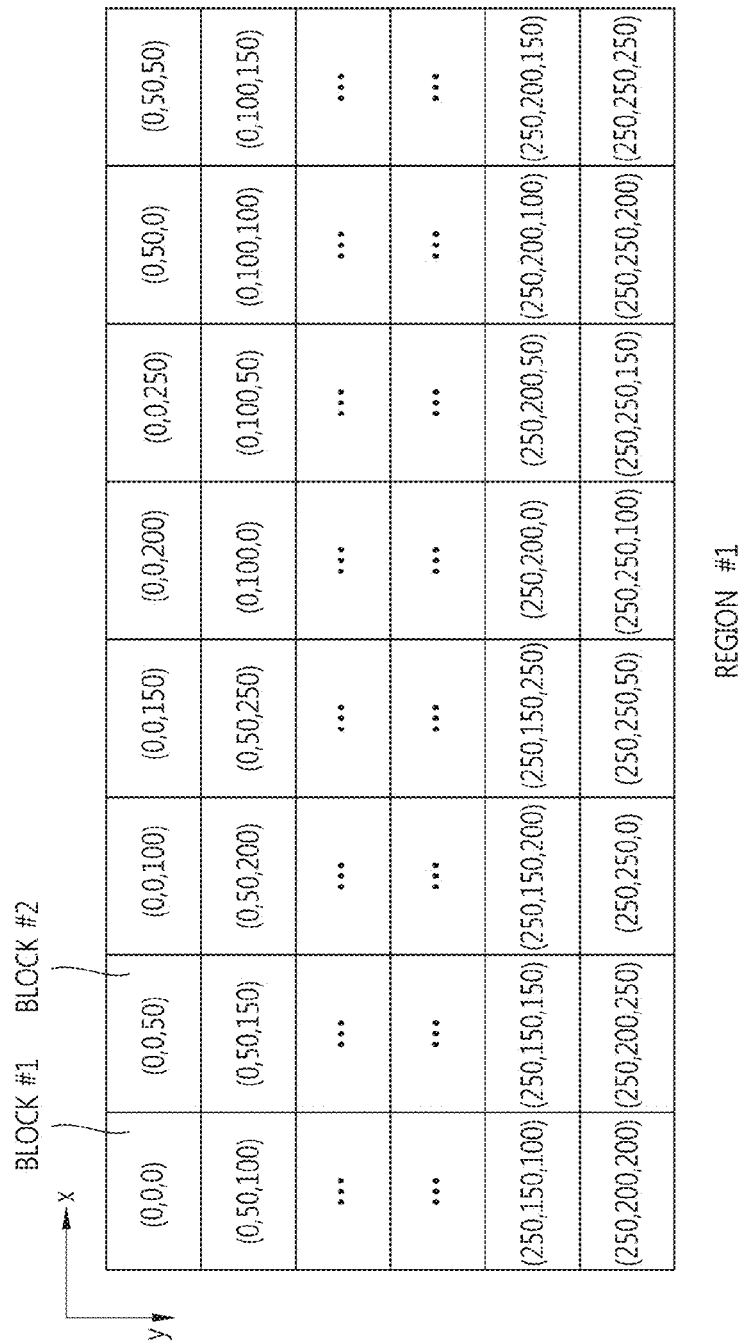
FIG. 3 is a diagram showing an example of a block color pattern of region #1 of the sample image.

FIG. 3 is a diagram showing an example of a block color pattern of region #1 of the sample image. The R, G, and B color values of the block increase sequentially along x-axis and y-axis directions. Each of the 216 blocks contains one of the possible 216 color values. If the number of blocks is 216×2=432 then each color value appears twice i.e. two blocks out of the 432 have the same color value.

Referring to FIG. 3, the region #1 of the sample image has color values (0, 0, 0), (0, 0, 50), (0, 0, 100), (0, 0, 150), (0, 0, 200), (0, 0, 250), (0, 50, 0), (0, 50, 50), (0, 50, 100), . . . , (250, 250, 250) in sequentially increasing order. When generating the sample image in which the sizes and the color patterns of each region are the same, region #2, region #3, and region #4, have the block color pattern similar to region #1 as shown in FIG. 3.

As another example, in case of plurality of occurrence of each block within each region, all the color values that can be represented by the R, G, and B may appear at least twice, thereby generating the sample image. In this case, in an example in which the R, G, and B are each assigned with 8 bits and k is 50, one region of the sample image is formed of at least 432 (216×2) blocks.

The apparatus for correcting colors, projects the sample image on the projection surface via the image projection device and its image is photographed by an image acquiring device (ex. a still camera). The process of projecting the sample image by the image projection device or the process of photographing the sample image by the image acquiring device may be controlled by the apparatus or may be controlled by a user.

Referring back to FIG. 1, the apparatus for correcting colors generates 3D color cubes for the n regions of the photographed image, based on the color values of each block of the sample image and the color values of the corresponding block in the photographed image (S120).

the color values of each block of the sample image and the color values of the corresponding block in the photographed image represents the input and output color values for each region that may be used for generating 3D color cubes by applying 3D interpolation to color values having a constant interval. As another option the apparatus for correcting colors may generate a new 3D color cube from the existing data as use it as a reference instead of the 3D color cube of a specific region.

Figure 4:
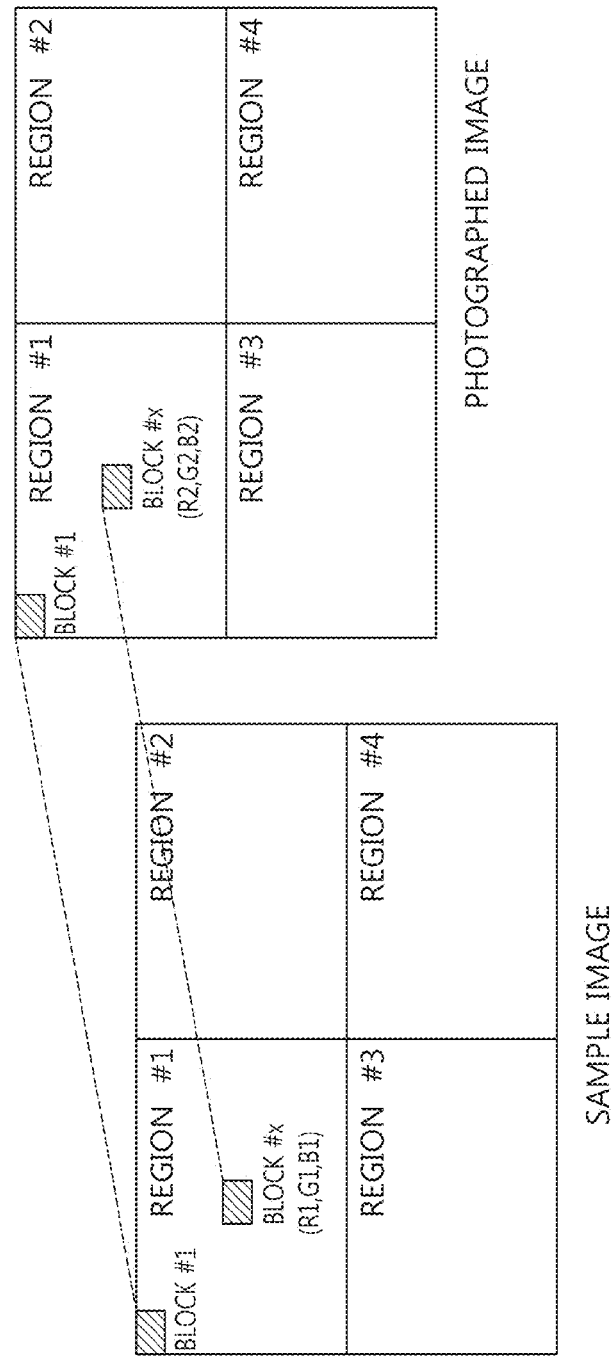
FIG. 4 is a diagram showing an example of corresponding blocks for each region of a sample image and a photographed image.

FIG. 4 is a diagram showing an example of the corresponding blocks for each region of the sample image and the photographed image.

Referring to FIG. 4, each region of the photographed image corresponds to each region of the sample image. In addition, each block within each region of the sample image corresponds to each block within each region of the photographed image. For example, the block #1 within the region #1 of the sample image corresponds to the block #1 of the region #1 of the photographed image. Reviewing the region #1 of the sample image and the region #1 of the photographed image, when original color value R1, B1, and G1 of block #x of the sample image is set as input color value to the projection device, color value R2, B2, and G2 of the block #x in the photographed image can be considered as the output color value. Thus, it is possible to determine the output color values for given input color values of the blocks, for each region and determine the relationship between input and output color values for each region in tabular format. When at least two blocks having different output color values for the same input color values are present within one region of the photographed image, the output color value may be defined by taking an average value of the output value of each block. For example, the input values of two blocks present in the same region of the sample image are identically (0, 0, 50) and the output values of two blocks of the corresponding photographed image are (0, 0, 33) and (0, 0, 37). (0, 0, 35) which is the average value of the two blocks is defined as the output value for the input values of (0, 0, 50) of the corresponding region. Or correct the difference between the two blocks by generating the 3D color cubes of each region and identifying the input values for which the output of both the regions is the same. In this case the intra projector color mis-match can be reduced.

TABLE 1

| | Region #1 | |
|---|---|---|
| Block # | Color Values For Each Block Of Sample Image (original color) | Color Values For Each Block Of Photographed Image (projected color) |
| 1 | (0, 0, 50) | (0, 0, 35) |
| 2 | (0, 0, 100) | (0, 0, 70) |
| 3 | (0, 0, 150) | (0, 0, 105) |
| ... | ... | ... |

The table 1 is an example in which the color values of the block from region #1 of the sample image and the color values of the block of region #1 in the photographed image are shown. The color values for each block of the sample image are matched with the input color values and the color values for each block of the corresponding photographed image are matched with the output color values.

Figure 5:
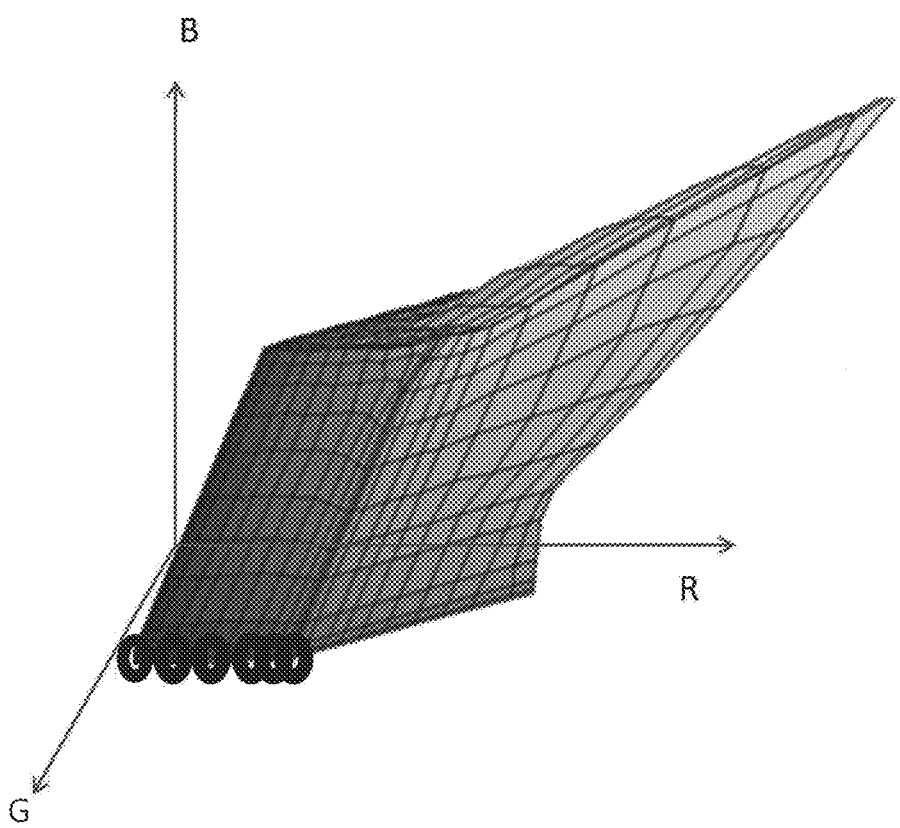
FIG. 5 is an example of 3D color cube of one region of the photographed image.

FIG. 5 is an example of a 3D color cube for one region of the photographed image.

As can be appreciated from FIG. 5, the apparatus for correcting colors may generate the 3D color cubes for each region based on the acquired input and output color values. When the color values are discrete i.e. having increments of 50, it is possible to generate the intermediate input and output values for the 3D color cube by using 3D interpolation.

In FIG. 5, each circle represents specific values of B, G, R. If B is set to 0 and G to 255 and value of R is increased by 50 from 0 to 250, the B, G, and R values are represented by the circles drawn in the figure. The intermediate values of the cube are obtained using 3D interpolation. Thus, generating the 3D color cube.

The 3D color cube shown in FIG. 5 is an example for describing the exemplary embodiment of the present invention and the shape of the 3D color cube may change according to characteristics and regions of the image projection device or characteristics of the projection surface.

Referring again to FIG. 1, the apparatus for correcting colors select a reference 3D color cube (S140). Here, the reference 3D color cube means the 3D color cube which becomes a reference of the input/output color for each region. i.e. the output color of other regions is expected to match the output color of the reference 3D color cube for the same input color.

As one example, the reference 3D color cube may be designated as a 3D color cube of a reference region. As another example, the reference 3D color cube may be designated as the new 3D color cube.

Here, the reference region means the region which becomes a reference of the output color for other regions i.e. the output color of other regions is expected to match the output color of the reference region for the same input color. As described above, when the image is projected by the image projection device, it is difficult to project a regular color. Therefore, by defining the reference region it is possible to generate a look up table for correcting the output color of each region with respect to the reference by defining one of the plurality of regions of the photographed image as the reference region.

Here, the reference region may be designated based on the input through the user interface. In addition, the reference region may be a region in which the color range is smallest among n regions of the photographed image and thus it is in the color range of other regions. For example, when region #1 of the photographed image has the output color range from 0 to 250 for the R, G, and B channels respectively, and another region has the output color range from 0 to 253, that is a larger range than the range 0 to 250, then region #1 has a smaller color range and therefore, becomes the reference region. If region #2 rather than the region #1 is the reference region, then due to physical limitations of the projection device region #1 cannot match the output color values from 251 to 253 as they are beyond its own color range. In some cases, there exists a possibility that the output color range cannot identify the region with the smallest color range. In this case, any one region may be selected by a user or set to be designated by the apparatus for correcting colors. In addition to this, the exemplary embodiment of the present invention may execute by setting the region in which the difference between the input colors of the sample image and the output colors of the photographed image is smallest as the reference region.

In another exemplary embodiment of the present invention if the smallest (the most inner) range of 3D cubes does not belong to a single region, the smallest corner point from each of the eight corners can be selected from the 3D cube points of each region to form a new 3D color cube. This new 3D cube represents the minimum color range as defined by the limitations of the 3D color cube of each region. Since, it contains the minimum of each region the colors of each region can be corrected with respect to this region. In another exemplary embodiment of the present invention for the case of plurality of projection devices, the smallest range of 3D color cube may not belong to a single region of a particular projection device. Thus, the smallest corner point for the eight corners of a new cube are selected from the corner points of the 3D cube for each projection device.

Referring again to FIG. 1, the apparatus for correcting colors generates look-up tables (LUTs) for regions that are to be corrected, based upon the reference 3D color cube. (S160).

Here, the look-up table (LUT) is formed as a table configured by the corrected input color values of each region, based on the input and output color value information of the reference 3D color cube. For example, when (0, 0, 35) is the output in the reference 3D color cube and, (0, 0, 40) and (0, 0, 45) are outputs in each of the regions for the input color values of (0, 0, 50) table is formed by performing the correction on the input color value for each region so as the output color value is equal to or approximating (0, 0, 35) in each regions in addition to the reference 3D color cube for the input color value (0, 0, 50). This means that instead of applying the same input color value of (0, 0, 50) the input color values will be modified so that same output color is obtained in each region.

The apparatus for correcting output colors, corrects the colors of input images that are input to the image projection device, using the look-up table (S180).

The apparatus for correcting colors receives the input image that is input to the image projection device. Thereafter, the corrected input image is transmitted to the input projection device by correcting the color of the input image for each region using the look up table for each region. Thereafter, the image projected by projecting the input image corrected by the image projection device on the projection surface has a regular color value. In this case, the color correction may be performed using the single sample image to minimize the time of color correction process and the color correction may be performed using the look-up table for each region to secure the quick performance.

As the example of the exemplary embodiment of the present invention, the color correction process performed by the apparatus for correcting a color may be subdivided into a color correction process and an input image correction process.

Figure 6:
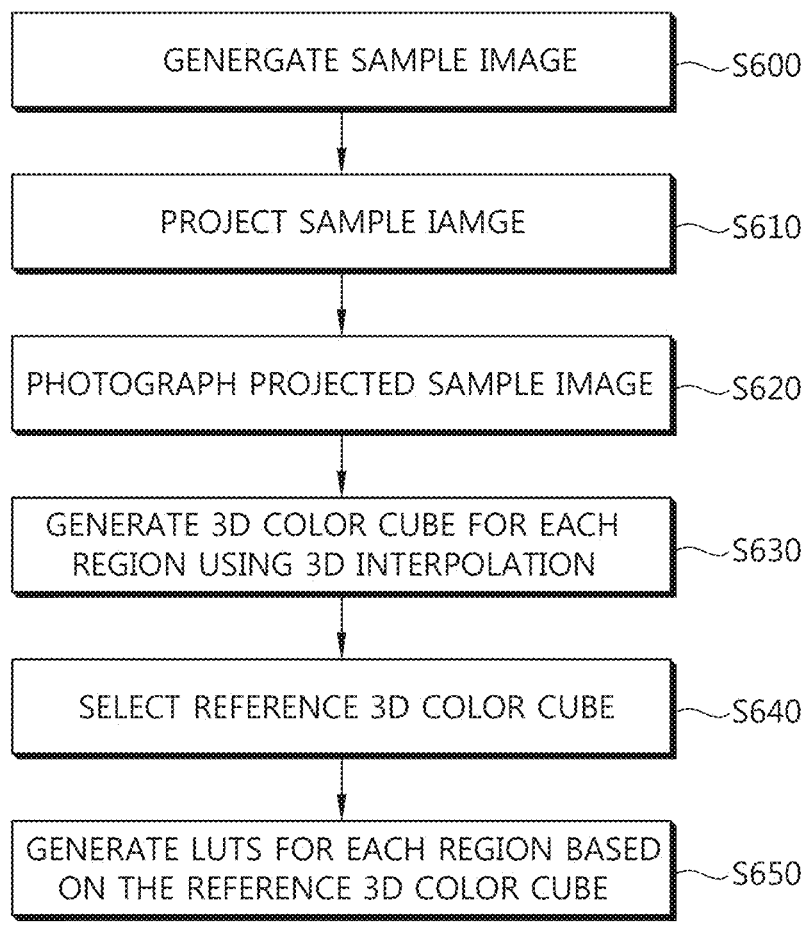
FIG. 6 is a diagram showing a color correction process using the apparatus for correcting a color according to the exemplary embodiment of the present invention.

FIG. 6 is a diagram showing the color correction process for the apparatus for correcting colors according to the exemplary embodiment of the present invention.

Referring to FIG. 6, the apparatus for correcting colors generates a repeated pattern sample image (S600).

The apparatus for correcting colors transmits the sample image to the image projection device (S610).

The apparatus for correcting colors projects the sample image on the projection surface using the image projection device and is photographed using an image acquiring device (S620).

The apparatus for correcting colors generates the 3D color cubes for each region (each of n regions) using 3D interpolation, based on the block color values of the sample image and the block color values of the photographed image (S630). The apparatus for correcting colors generates the 3D color cubes may also generate a new 3D color cube selecting its end points from among the corners of the available 3D color cubes so that the new 3D color cube is the smallest in size.

The apparatus for correcting colors selects a reference 3D color cube based on the 3D color cubes for each region (S640). As described above, the reference 3D color cube may be a color cube of a reference region. Or the reference 3D color cube may be the new 3D color cube which formed by combining the minimum (edge) values of cubes of different regions, to obtain a new reference which is the smallest 3D color cube.

As described above, the reference region may be directly set by the user interface or the region in which the color range is smallest may be selected as the reference region. In addition to this, the region in which the difference between the input colors of the sample image and the output colors of the photographed image is smallest may be selected as the reference region or any one region may be set to be the reference region.

The apparatus for correcting a color generates the look-up tables (LUTs), based on the reference 3D color cubes.

Figure 7:
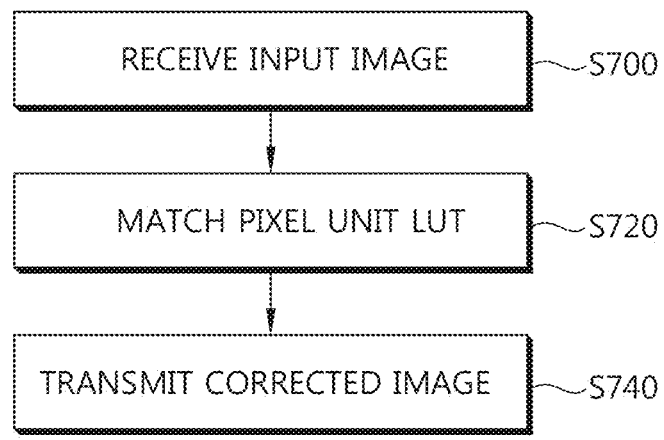
FIG. 7 is a diagram showing an input image correction process using the apparatus for correcting colors according to the exemplary embodiment of the present invention.

FIG. 7 is a diagram showing the input image correction process that is performed by the apparatus for correcting colors according to the exemplary embodiment of the present invention.

Referring to FIG. 7, the apparatus for correcting colors receives the input image that is input to the image projection device (S700).

The apparatus for correcting colors performs the LUT based matching for each pixel for each region of the input image, based on the LUTs for each region (S720).

The input image is corrected to represent the regular color value by the LUT matching.

The apparatus for correcting a color transmits the corrected image to the image projection device (S740).

Next, in the image projection device, the color corrected image is projected on the projection surface.

Further, the exemplary embodiments of the present invention can also be applied to the multi image projection device system.

Figure 8:
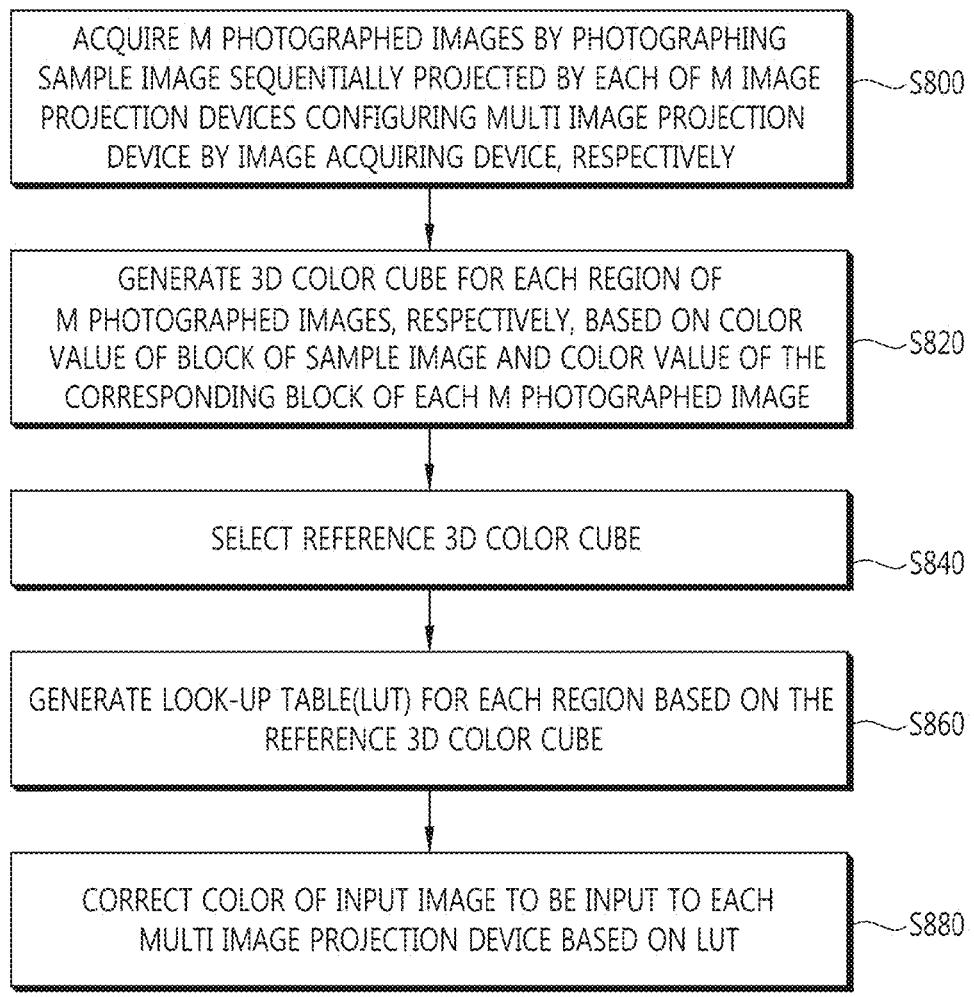
FIG. 8 is a diagram showing an example in which the present invention is applied to a multi image projection device system.

FIG. 8 is a diagram showing an example in which the present invention is applied to the multi image projection device system.

The apparatus for correcting colors acquires m photographed images, each of the m photographed images may consist of n regions, by photographing a sample image sequentially projected by each of the m image projection devices configuring the multi image projection device using the image acquiring device, respectively (S800).

The apparatus for correcting colors generates a 3D color cube for each region of the m photographed images (S820). The apparatus for correcting colors may further generate a new 3D color cube selecting its end points from among the corners of the available 3D color cubes so that the new 3D color cube is the smallest in size The apparatus for correcting colors selects a reference 3D color cube (S840). The apparatus for correcting colors may select one of m×n regions of photographed images as the reference region, and select the 3D color cube of the reference region as the reference 3D color cube. Or The apparatus for correcting colors may select the new 3D color cube which formed by combining the minimum (edge) values of cubes of different regions, to obtain a new reference which is the smallest 3D color cube as the reference 3D color cube.

The single photographed image contains n regions and there are m photographed images therefore, the total number of regions becomes m×n.

The apparatus for correcting colors generates look-up tables for each region, based on the reference 3D color cube (S860).

The apparatus for correcting colors uses the look-up table to correct the color of the input image that is input to the multi image projection device (S880).

As described above, the apparatus for correcting colors receives the input image color information from the input colors for each region for each image projection device from the LUT. Next, the apparatus for correcting colors transmits the corrected input image to the corresponding image projection device, respectively.

Figure 9:
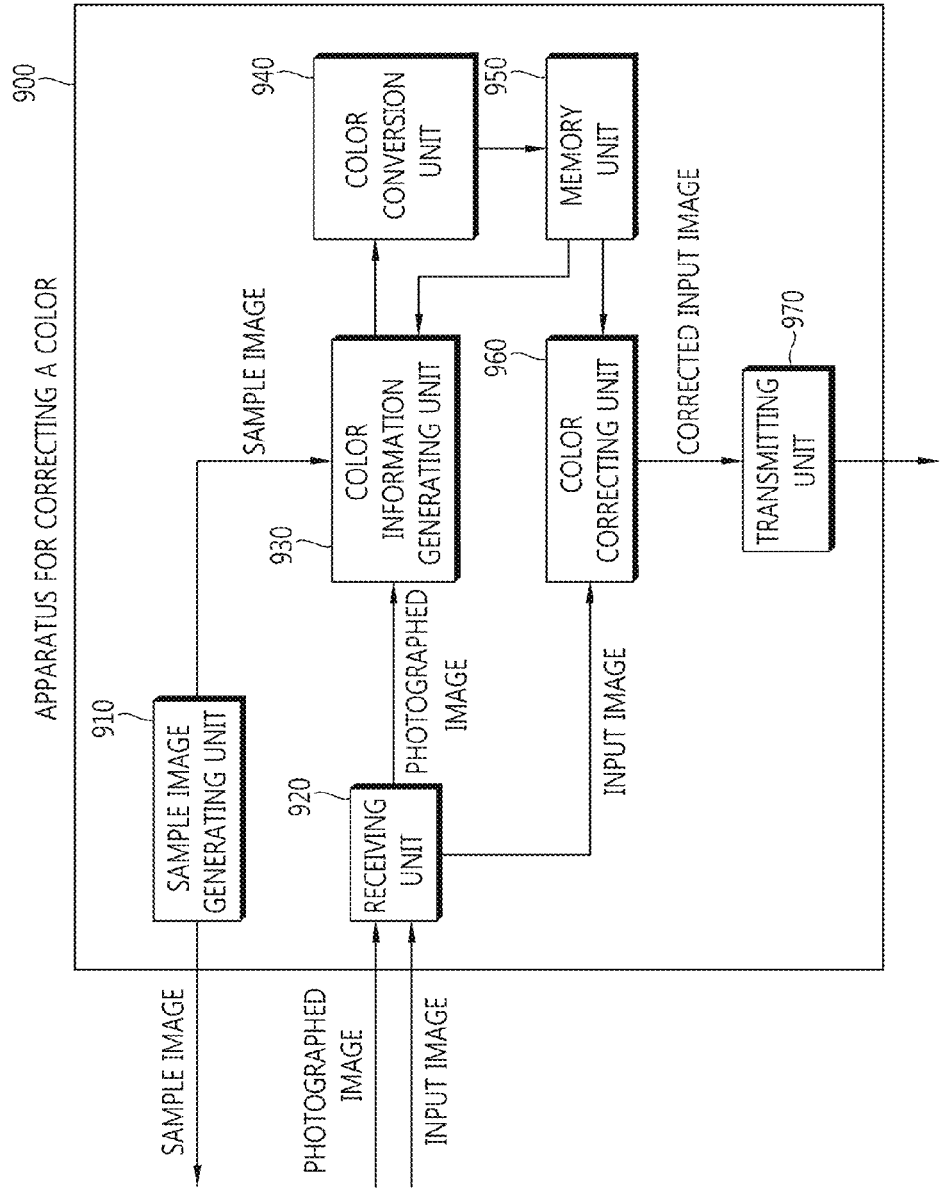
FIG. 9 is a diagram showing an example of the apparatus for correcting colors according to the exemplary embodiment of the present invention.

FIG. 9 is a diagram showing an example of the apparatus for correcting colors according to the exemplary embodiment of the present invention.

Referring to FIG. 9, an apparatus 900 for correcting colors includes a sample image generating unit 910, a receiving unit 920, a color information generating unit 930, a color conversion unit 940, a memory unit 950, a color correction unit 960, and a transmitting unit 970.

The sample image generating unit 910 generates the sample image for color correction of the image projection device. Upon generating the sample image, the sample image may be produced so as to divide the sample image into n regions of which the sizes and the color patterns are the same.

The sample image generating unit 910 generates the sample image including the plurality of blocks for each region, wherein each color value of each of the plurality of blocks corresponds to the R, G, and B values, that lie between the minimum and maximum range. When the R, G, and B are each assigned 8 bits in the sample image generating unit 910, the colors between (0, 0, 0) and (255, 255, 255) may be represented. The sample image generating unit 910 may set any one value to a multiple of k to represent the color values for the plurality of blocks. In addition, the k value may be previously set or the k may be determined based on the input by the user interface.

In addition, the sample image generating unit 910 may generate the sample image so that each of the possible all color values that can be represented by the R, G, and B appear at least once when the sample image is generated. The sample image generating unit 910 may also generate the sample image so that k=50 and each of the color values that can be represented by the R, G, and B corresponding to the plurality of blocks within one region appears at least twice.

Although FIG. 9 shows the sample image generating unit 910, of the apparatus, to generate the sample image to perform the color correction operation, the apparatus 900 for correcting colors may use a previously produced sample image. In the later case, the color values of the sample image may be received in the receiving unit 920 or the color values of the sample image previously input to the memory unit 950 may be used. In this case, the sample image generating unit 910 may be omitted.

The receiving unit 920 acquires the photographed image of the projection surface using an image acquiring device. The photographed image may comprise of n regions i.e. equal to the number of regions in the input image.

The color information generating unit 930 generates the input and output color information for each block in each region of the photographed image. This is done based on the color values of the block in the sample image and the color values of the corresponding block in the photographed image.

The color information generating unit 930 considers the color values of the block of the sample image as the input colors and the color values of the corresponding block of the corresponding photographed image as the output colors and may generate input and output information for each region based on the input color and the output color. For example, the color information generating unit 930 may generate the 3D color cube for each region by applying the 3D interpolation to the input and output color information. The color information generating unit 930 may also generate a new 3D color cube selecting its end points/corners from among the corners of the available 3D color cubes so that the new formed 3D color cube is the smallest in size. The other available 3D color cubes represent other regions of the projection device.

The color conversion unit 940 may select one of the n regions of the photographed image as the reference region based on the input by the user interface or may also select a reference region in which the color range of the 3D color cube among the plurality of 3D color cubes of other regions, in the photographed image, is smallest. In addition to this, the color conversion unit 940 may select as the reference region the region in which the difference between the input colors of the sample image and the output colors of the photographed image is smallest or select any one region as the reference region.

The color conversion unit 940 may select the 3D color cube of the reference region as a reference 3D color cube. Also, the color conversion unit 940 may select the new 3D color cube as the reference 3D color cube.

The color conversion unit 940 generates the look-up tables for each region based on the reference 3D color cube, and stores the generated look-up tables in the memory unit 950.

The color correction unit 960 uses the look-up tables saved in the memory unit 950 to correct the colors of any input image to be projected by the image projection device. In addition to the operation for the receiving unit 920 to receive the input images, the input images may be transmitted to the color correction unit.

The transmitting unit 970 receives the color corrected input images from the color correction unit and transmits the received color information to the image projection device, such that the image projection device may project the corrected input image.

In addition, when the multi image projection device of the present invention is applied, the receiving unit 920 of the apparatus 900 for correcting a color acquires the m photographed images, each of photographed images has n regions, by photographing the sample image projected sequentially on the projection surface by the m image projection devices one after another.

The color information generating unit 930 generates the input and output color information for each block in each region of the m photographed images, respectively, based on the color values of a block in the sample image and the color values of the block in the photographed images.

The color information generating unit 930 considers the color values of the block of the sample image as the input colors and the color values of the corresponding block of the corresponding photographed image as the output colors and may generate input and output information for each of the m×n regions based on the input color and the output color. For example, the color information generating unit 930 may generate the 3D color cube for each of the m×n regions by applying the 3D interpolation to the input and output color information. Also, the color information generating unit 930 may generate a new 3D color cube selecting its end points/corners from among the corners of the available 3D color cubes so that the new formed 3D color cube is the smallest in size. The other available 3D color cubes represent the regions of the m projection devices.

The color conversion unit 940 may select one of the m×n regions of photographed images as a reference region. For example, The color conversion unit 940 may select one of the m×n regions of the photographed image as the reference region based on the input by the user interface or may also select a reference region in which the color range of the 3D cube among the plurality of 3D cubes of other regions, in the photographed image, is smallest. In addition to this, the color conversion unit 940 may select as the reference region a region in which the difference between the input colors of the sample image and the output colors of the photographed image is smallest or may select any one region as the reference region.

The color conversion unit 940 may select the 3D color cube of the reference region as a reference 3D color cube. Also the color conversion unit 940 may select the new 3D color cube as the reference 3D color cube. And the color conversion unit 940 generates the look-up tables for each region based on the reference 3D color cube The memory unit 950 records the look-up tables.

The color correction unit 960 uses the look-up tables saved in the memory unit 950 to correct the colors of the input image to be input to the multi projection device.

The transmitting unit 970 transmits the color information of the corrected input image to each image projection device.

Figure 10:
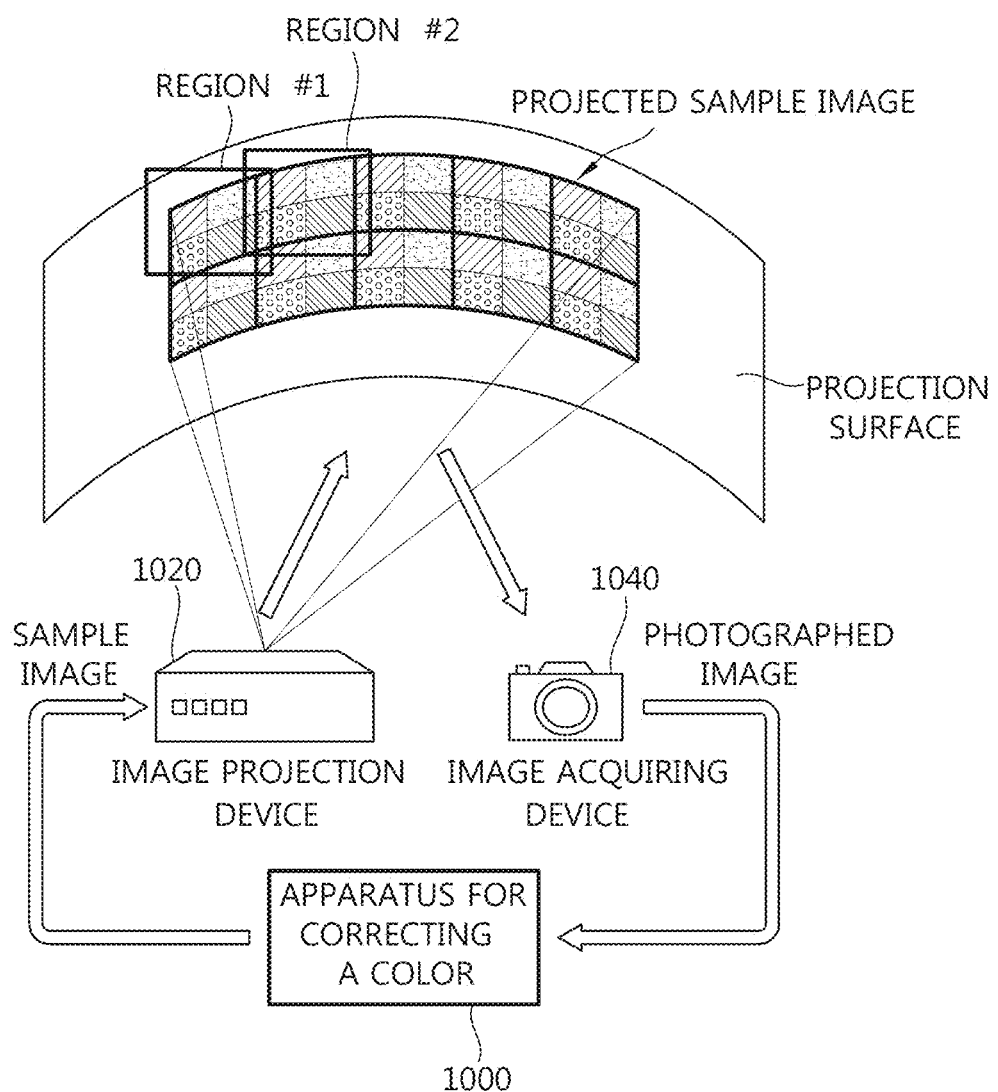
FIG. 10 is a diagram showing a color correction process of a system for correcting colors according to an exemplary embodiment of the present invention.

FIG. 10 is a diagram showing the color correction process of the system for correcting a color according to an exemplary embodiment of the present invention.

Referring to FIG. 10, an apparatus 1000 for correcting colors generates the sample image having color patterns for color correction. The apparatus 1000 for correcting a color transmits the sample image to an image projection device 1020. The image projection device 1020 projects the sample image on to the projection surface. An image acquiring device 1040 photographs the sample image projected on the projection surface to generate the photographed image and transmit the acquired images to the apparatus 1000 for color correction. Further, the apparatus 1000 for correcting a color generates the look-up tables (LUTs) for each region based on the color values of the sample image and the color values of the acquired photographed image.

Figure 11:
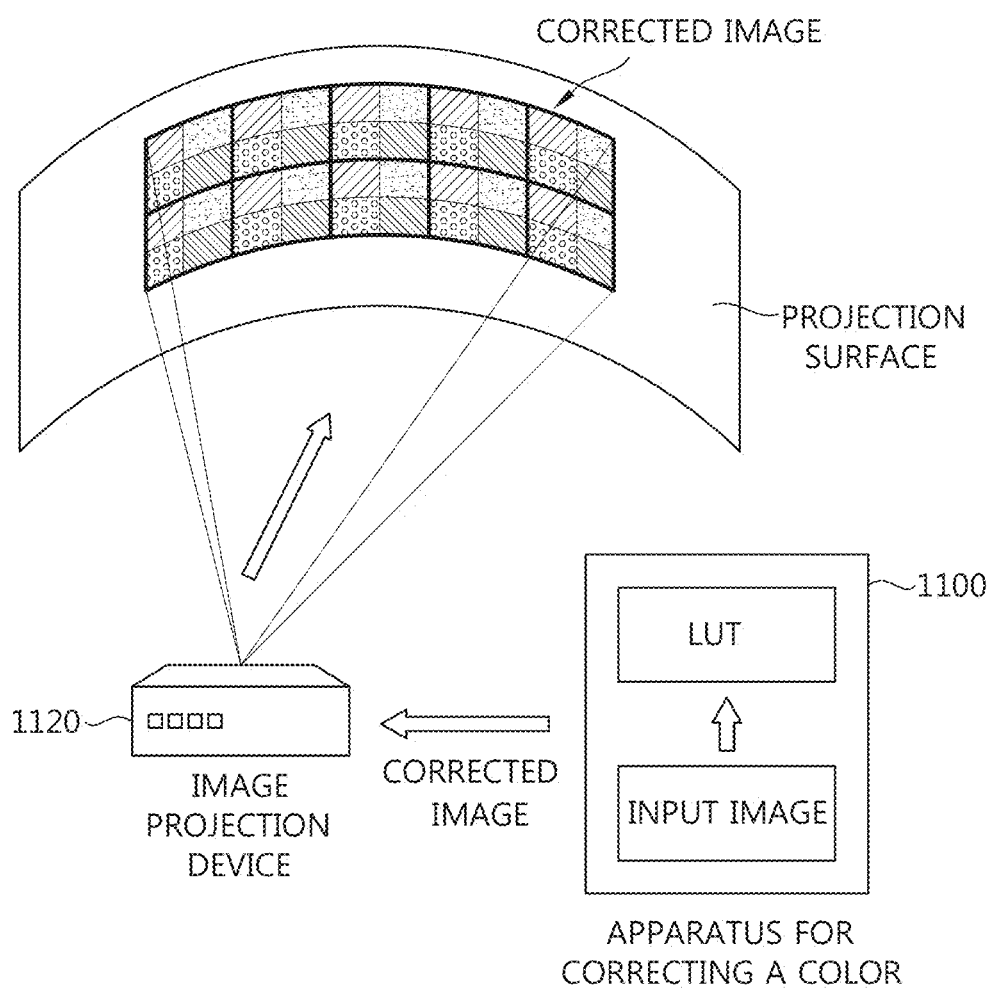
FIG. 11 is a diagram showing a process of correcting colors and then projecting a corrected image by the system according to the exemplary embodiment of the present invention.

FIG. 11 is a diagram showing the process of correcting the colors of an input image and then projecting the corrected image according to the exemplary embodiment of the present invention.

Referring to FIG. 11, an apparatus 1100, for correcting colors, corrects the input image based on the generated LUT. The apparatus 1100 may transmit the corrected images to the image projection device 1120 and the image projection device 1120 may project the corrected images.

FIG. 11 shows that the corrected image is projected but is only an example. The apparatus 1100 for correcting a color receives the input image to be projected through the apparatus for projecting an image and corrects the input image based on the LUT and transmits the corrected image to the image projection device 1120, thereby minimizing the irregular color difference of the input image on the projection surface.

FIGS. 12A and 12B are diagrams showing an input image before and after color correction according to the exemplary embodiment of the present invention.

FIG. 12A shows an image with distorted colors due to the characteristics of the image projection device and FIG. 12B shows the image after application of the color correction procedure by the present invention.

In the single projection or multi projection system according to the exemplary embodiments of the present invention, it is possible to minimize the color difference of the projected image and simplify the correction procedure to secure the quick performance.

The spirit of the present invention has been just exemplified. It will be appreciated by those skilled in the art that various modifications and alterations can be made without departing from the essential characteristics of the present invention. Accordingly, the embodiments disclosed in the present invention and the accompanying drawings are used not to limit but to describe the spirit of the present invention. The scope of the present invention is not limited only to the embodiments. The protection scope of the present invention must be analyzed by the appended claims and it should be analyzed that all spirits within a scope equivalent thereto are included in the appended claims of the present invention.

What is claimed is:

1. A method for correcting colors for an image projection device performed by an apparatus for correcting colors, comprising of:
    acquiring a photographed image by an image acquiring device, by photographing a sample image projected on a projection surface, the photographed image comprising n regions, wherein n represents number of regions and n is an integer greater than 1;
    generating 3D color cubes for the n regions of the photographed image, based on color values of each block in the sample image and color values of a corresponding block in the photographed image, wherein each of the 3D color cubes is 3D color map generated by using 3D interpolation regarding corresponding region among n regions;
    selecting a reference 3D color cube;
    generating look-up tables (LUTs) for each of the n regions, based on the reference 3D color cube; and
    correcting colors of input images to be projected by the image projection device using the look-up tables.

2. The method of claim 1, wherein the sample image is divided into n regions of which the sizes and the color patterns are the same.

3. The method of claim 2, wherein each region of the sample image includes a plurality of blocks and the color values of each of the plurality of blocks correspond to R, G, and B, with the R, G, and B having values between minimum and maximum values as defined by the number of bits allocated per channel.

4. The method of claim 3, wherein the value of each R, G, and B is a multiple of k,
    wherein k is an integer value.

5. The method of claim 4, wherein the possible color value represented by the R, G, and B correspond to the plurality of blocks at least once.

6. The method of claim 1, wherein the reference 3D color cube is selected as a 3D color cube of a reference region in of which color range is smallest as compared to other n−1 regions of the photographed image.

7. The method of claim 1, wherein the reference 3D color cube is selected as a 3D color cube of a reference region in which the difference between the input colors of the sample image and the corresponding output colors of the photographed image is smallest as compared to other n−1 regions of the photographed image.

8. The method of claim 1, further comprising:
    generating a new 3D color cube selecting its end points from among the corners of the available 3D color cubes so that the new 3D color cube is the smallest in size, wherein the reference 3D color cube is selected as the new 3D color cube.

9. An apparatus for correcting colors of an image projection device, comprising:
- a receiving unit configured to acquire a photographed image by an image acquiring device, the photographed image consisting of n regions, by photographing a sample image containing n regions, projected on a projection surface by an image projection device, wherein n represents number of regions and n is an integer greater than 1;
- a color information generating unit configured to generate 3D color cubes for the n regions in the photographed image, based on color values of each block in the sample image and color values of a corresponding block in the photographed image, wherein each of the 3D color cubes is 3D color map generated by using 3D interpolation regarding corresponding region among n regions;
- a color conversion unit configured to select a reference 3D color cube, and generate look-up tables (LUTs) for each of the n regions, based on the reference 3D color cube;
- a memory unit configured to record the look-up tables;
- a color correction unit configured to correct colors of input images using the look-up tables; and
- a transmitting unit configured to transmit the corrected input images to the image projection device.

10. The apparatus of claim 9, wherein the receiving unit further receives color values of the sample image.

11. The apparatus of claim 9, further comprising: a sample image generating unit configured to generate the sample image.

12. The apparatus of claim 11, wherein the sample image generating unit forms the sample image so as to divide the sample image into n regions of which the sizes and the color patterns are the same.

13. The apparatus of claim 12, wherein the sample image generating unit generates the sample image including a plurality of blocks for each region, the color values of each of the plurality of blocks corresponding to R, G, and B and the R, G, and B each having any one value between a minimum value and a maximum value.

14. The apparatus of claim 13, wherein the sample image generating unit sets each value after increment of multiple of k upon generating the sample image, and
   wherein k is an integer value.

15. The apparatus of claim 14, wherein the sample image generating unit sets each of the color values represented by the R, G, and B to be color values of at least one of the plurality of blocks upon generating the sample image.

16. The apparatus of claim 9, wherein the color conversion unit selects a 3D color cube of a reference region, in of which color range is smallest as compared to other n−1 regions in the photographed image, as the reference 3D color cube.

17. The apparatus of claim 9, wherein the color information generating unit generates a new 3D color cube selecting its end points from among the corners of the available 3D color cubes so that the new 3D color cube is the smallest in size; and
   wherein the color conversion unit selects the new 3D color cube as the reference 3D color cube.

18. An apparatus for correcting a color for a multi image projection device system, comprising:
- a receiving unit configured to acquire m photographed images, each of the m photographed images contains n regions, by photographing a sample image sequentially projected on a projection surface by image projection devices configuring a multi image projection device by an image acquiring device, respectively,
   wherein m is a number of the photographed images acquired, and
   wherein n represents number of regions and n is an integer greater than 1;
- a color information generating unit configured to generate 3D color cubes for m×n regions, based on color values of each block in the sample image and color values of each block of the m photographed images corresponding to the block in the sample image, wherein each of the 3D color cubes is 3D color map generated by using 3D interpolation regarding corresponding region among n regions;
- a color conversion unit configured to select a reference 3D color cube, and generate look-up tables (LUTs) for each of the n regions, based on the reference 3D color cube;
- a memory unit configured to record the look-up tables;
- a color correcting unit configured to correct colors of images to be input to the multi image projection device using the look-up tables; and
- a transmitting unit configured to transmit the corrected input images to each image projection device.

19. The apparatus of claim 18, wherein the color conversion unit selects a 3D color cube of a reference region, in of which color range is smallest as compared to other n−1 regions in the photographed image, as the reference 3D color cube.

20. The apparatus of claim 18, wherein the color information generating unit generates a new 3D color cube selecting its end points from among the corners of the available 3D color cubes so that the new 3D color cube is the smallest in size; and
   wherein the color conversion unit selects the new 3D color cube as the reference 3D color cube.

* * * * *